Patented July 25, 1944

2,354,475

UNITED STATES PATENT OFFICE 2,354,475

METHOD OF PRODUCING LEAD ARSENATE

John S. Nordyke, Joplin, Mo., assignor to The Eagle-Picher Lead Company, Cincinnati, Ohio, a corporation of Ohio No Drawing. Application May 7, 1941, Serial No. 392,389

5 Claims. (Cl. 23—54)

This invention relates to insecticides and the method of manufacturing the same whereby I am enabled to produce an insecticide such as lead arsenate with a high degree of adhesiveness, which will permit its retention on foliage for a much longer period of time than known lead arsenates which settles from suspension very slowly; which is practically impervious to the action of water, and which can be so treated as to produce a fast color.

In the preparation of the present lead arsenate of commerce a slurry of litharge and water is prepared, to which is added arsenic acid in definite proportions over a period of time. The resulting precipitate is normally the color of flour, and to guard against its use as food, a red or colored powdered pigment is mechanically blended with the lead arsenate, which serves to identify it as a definite product. In this form a certain amount of lead arsenate is rendered soluble in water by reaction with the coloring matter, causing loss of product and deleterious effect on vegetation from the presence of soluble arsenate. The desirability of a lead arsenate with an insoluble fast color has long been recognized, and many unsuccessful attempts have heretofore been made to accomplish this.

In the practice of my invention I have found that the addition of lead silicate to the litharge in definitely regulated quantities enables me to produce a lead arsenate with a high degree of adhesiveness. While I have used lead silicate that is basic in nature, I have found the best results can be reached by using anhydrous basic lead silicate corresponding to any of the following compositions:

4PbO.SiO₂ _____ Tetralead silicate
2PbO.SiO₂ _____ Lead orthosilicate
PbO.SiO₂ _____ Lead metasilicate or their eutectics, or mixtures of these silicates with their eutectics. We have found the best results are obtained by using the eutectic mixture lead orthosilicate—lead metasilicate. All these silicates decompose completely on reaction with arsenic acid solution forming lead arsenate and gelatinous silica. Furthermore, all the silica liberated is set free in the gelatinous state so that no crystalline silica is present in the system. The above range of lead silicates includes the range from 6.3% to 21.2% of silica. However, a lead silicate whose composition represents a mixture of tetra lead silicate (4PbO.SiO₂) and PbO is equally effective.

Instead of the anhydrous lead silicate, the corresponding hydrated form may be used. In this case the range of composition best suited lies between the lead orthosilicate (2PbO.SiO₂) and lead metasilicate (PbO.SiO₂). The hydrated eutectic mixture lead orthosilicate—lead metasilicate represents the most desirable composition.

Since we have found the substitution of lead silicate for litharge as defined in the application is based on the weight percentage of silica in the lead silicate used, the percentage of substitution may vary with the silica content of the lead silicate.

As one example of the process used by me in the practice of my invention in which 1% of the litharge is replaced by its PbO equivalent of lead silicate, I first heat 1429 gallons of water to approximately 90° C., and add, with constant stirring, 3819 pounds of finely divided litharge, mixed with approximately 47 pounds of basic lead silicate, and the whole is stirred rapidly for approximately 15 minutes. Cold water is next added in a sufficient quantity to dilute the mixture to approximately 2800 gallons, and lower the temperature to 70° C. Arsenic acid equivalent to approximately 1989 pounds of As₂O₅ with a proportion of 61% As₂O₅ is then added in the proportion of approximately ⅓ in the first 1½ hours and the remaining ⅔ over a period of one hour. The mixture is then cooled with the addition of approximately 700 gallons of cold water and the precipitated arsenate is filter pressed and dried at a temperature not in excess of 110° C. The product may then be pulverized and packed ready for shipment. My process is effective, regardless of the percentage of lead silicate added. I have, for instance, substituted 1% of lead silicate for the PbO equivalent of litharge. Again I have substituted an equivalent amount of hydrated lead silicate for the entire PbO content. In normal practice I have found good results are reached by using a replacement of from .5% to 5% of the litharge with its PbO equivalent of lead silicate when the lead silicate has a PbO content of 83.5% and SiO₂ 14.7%, the balance being combined water. Within the limits of 1% to 2% the amount of lead silicate added may be regarded as critical. The beneficial results obtained are due in part to the silica gel formed, during precipitation, and which is considered to be present as a surface coating on the lead arsenate particles. I have, for example, produced highly beneficial effects when the silica gel is present on the particles in an amount varying from 0.1% to 1%, although other proportions have proved beneficial. In those cases when it is desired to render the lead arsenate more water repellent and permanent in nature, I have found the addition of an oil soluble and water insoluble dye serves to coat the pigment particle without affecting its adhesiveness or impairing its properties as an insecticide. In order to distribute the oil thoroughly and utilize the dye completely it is necessary to add the oil solution in the form of an emulsion in water and thus make the microscopic oil globules more readily available to the particles of insecticide throughout the slurry. Again I may dissolve the emulsifying agent in the solvent together with the dye and add the solution to the slurry of arsenate and silica and in this manner emulsify the dye solution in the slurry. The precipitated, colored lead arsenate is then filter pressed and dried at a temperature of 100° C., pulverized and packed for shipment.

My coloring process is to be distinguished from those cases of coloring lead arsenate and other materials in which the color is added as a dry powder that dilutes the lead arsenate and decreases the concentration and effectiveness thereof. Further, my coloring process must not be confused with those in which the dye is added as a water solution. The liquor is colored and much of the dye is lost in the process, and the absorbed dye tends to bleed during use. My process eliminates case hardening and all the dye is utilized so that a smaller quantity is effective as compared with a larger quantity required in a solution. In the prepared form lead arsenate made by my process has the formula $2PbO.As_2O_5.H_2O$ or $PbHAsO_4$ with the admixture of approximately 0.15 per cent of gelatinous silica.

By my process I am enabled to achieve the new and unobvious results of improved suspension of the insecticide in water slurry, and of improved adhesion of the lead arsenate so prepared to fruit and foliage. The improvement in suspension due to the presence of silica gel in lead arsenate is shown by the following table. The numerical values represent the apparent volume in cubic centimeters occupied by 15 grams of the insecticide at one minute intervals after dispersion in 250 cubic centimeters of water slurry. This is shown for 3 percentages of lead silicate.

| Time in minutes | Per cent of lead silicate | | |
| --- | --- | --- | --- |
| | 0 | 1 | 2 |
| 0 | 250 | 250 | 250 |
| 1 | 246 | 248 | 249 |
| 2 | 238 | 246 | 248 |
| 3 | 225 | 244 | 247 |
| 4 | 211 | 232 | 246 |
| 5 | 196 | 218 | 245 |
| 6 | 181 | 204 | 244 |
| 7 | 165 | 190 | 243 |
| 8 | 150 | 178 | 242 |
| 9 | 134 | 164 | 240 |
| 10 | 122 | 152 | 239 |

The lead silicate used in my process may be acid, basic or normal and should be free from uncombined lead oxide or silica and physically and chemically homogeneous.

Having thus described my invention, what I claim as new and desire to secure by Letters Patent is:

1. The method for producing lead arsenate which comprises adding arsenic acid to lead silicate and decomposing the lead silicate to form lead arsenate in the presence of precipitated silica, said precipitated silica being coated on the particles of lead arsenate.

2. The method for producing lead arsenate which comprises adding arsenic acid to a mixture of litharge and lead silicate and decomposing the lead silicate to form lead arsenate in the presence of precipitated silica and coating the particles of lead arsenate with the precipitated silica.

3. The method for producing lead arsenate which comprises adding arsenic acid to a mixture of litharge and lead silicate, forming a slurry from the mixture and precipitating lead arsenate coated with precipitated silica from the slurry.

4. The process for producing lead arsenate which comprises mixing basic lead silicate and arsenic acid and forming a slurry therefrom and precipitating from the slurry lead arsenate in the presence of precipitated silica.

5. The process for producing lead arsenate which comprises mixing basic lead silicate, litharge and arsenic acid and forming a slurry therefrom and precipitating from the slurry lead arsenate in the presence of precipitated silica.

JOHN S. NORDYKE.